United States Patent Office 3,485,238
Patented Dec. 23, 1969

3,485,238
DEVICE FOR MEASURING ARTERIAL BLOOD PRESSURE IN LIVING BODY UNDER VARIABLE AMBIENT PRESSURE
Pavel Mikhailovich Kostrov, Ul. Shkalnaya 14, kv. 12; Viktor Nikolaevich Kozlov, nab. Chernoi rechki 41, kv. 7a; Vladimir Mikhailovich Garin, Liteiny pr. 11, kv. 32; Viktor Alexeevich Ivanov, Ul. Bolshaya Zelenina 4/6, kv. 21; and Jury Ivanovich Dmitriev, Ul. Varshavskaya 41, korp. 3, kv. 89, all of Leningrad, U.S.S.R.
Filed Mar. 30, 1967, Ser. No. 627,195
Int. Cl. A61b 5/02
U.S. Cl. 128—2.05
2 Claims

ABSTRACT OF THE DISCLOSURE

A device for measuring arterial blood pressure, particularly of a diver during descending, operating on the bottom and ascending in which between a pressure source and inflatable collar are located an air pressure reducer a normally closed controllable valve for providing within the collar a pressure exceeding the normal systolic blood pressure and an automatic decompression rate regulator for reducing the pressure in the collar at the preset constant rate independently on the value of the external pressure.

BACKGROUND OF THE INVENTION

The present invention relates to apparatus for measuring arterial blood pressure in a living body under variable ambient pressure, and particularly to devices for measuring the arterial blood pressure of divers while descending, performing underwater jobs and ascending.

Known in the art are devices for measuring arterial blood pressure, which comprise an inflatable collar connected to a source of pressure, a pressure gauge to measure the pressure within the collar, a release cock for said pressure to slowly drop and a means for listening to oscillations of the arterial walls.

However, the aforesaid devices fail to be used for measuring arterial blood pressure of divers during descending, underwater work and ascending under ambient pressure varying in dependence with the depth of descent.

SUMMARY OF THE INVENTION

In accordance with the foregoing, the invention has for its object the provision of a device simple in design and trouble-free in operation which will be capable of measuring the arterial blood pressure of a diver under variable ambient pressure depending upon the depth of descent.

With these and other objects in view, the invention is directed to a device capable of self-setting for pressure and intended for measuring the arterial blood pressure of divers under variable ambient pressure.

The salient object of the invention is achieved due to the fact that in a device for measuring arterial blood pressure of a diver under variable excess pressure, Provision is made for an air pressure reducer capable of maintaining a constant preset pressure at the outlet thereof, a normally closed controllable valve capable of being opened for a lapse of time sufficient for building up within the collar an initial pressure exceeding systolic pressure, and an automatic decompression rate regulator adapted for reducing the pressure within the collar at a preset constant rate irrespective of the ambient pressure, with all the components mentioned above being series-connected between the source of pressure and the collar.

The automatic decompression rate regulator can be constituted as a multiple-chamber body provided with pressure-sensitive membranes capable of responding to the differential pressure between the collar supply source and the surrounding medium so as to correspondingly vary the rate of decompression within the collar, and a controllable throttle valve being connected to an intermembrane space.

The controllable outlet throttle valve can be provided with a pressure-sensitive bellows capable of responding to the variation in the pressure within the intermembrane space of the aforesaid regulator which variation depends upon that of the ambient pressure, and the bellows carries a rod with a piston which is adapted to close outlet orifices of different clear areas.

The aforementioned air pressure reducer can conveniently be of the valve-membrane type with two consecutive pressure reduction stages.

Further objects and advantages of the invention will become more readily apparent to persons skilled in the art from the exemplary embodiment given by way of illustration in conjunction with the accompanying drawings, wherein:

DETAILED DESCRIPTION OF THE INVENTION

Figure 1:
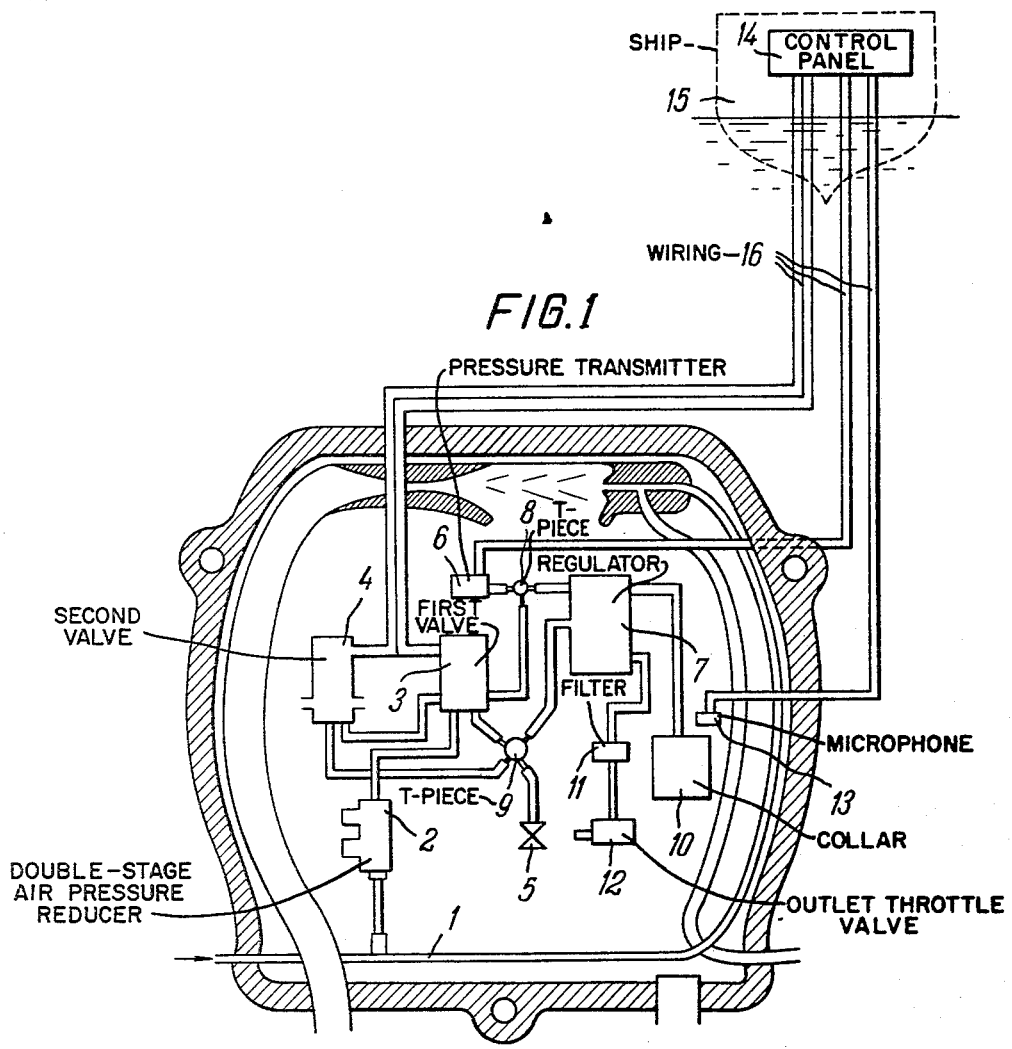
FIG. 1 is a diagrammatic view partly in elevation and partly in section of a liver's helmet with the device of the present invention for measuring arterial blood pressure built therein.

Referring to the drawings, 1 represents an air supply line to which a double-stage air pressure reducer 2 is connected. The outlet of the reducer communicates with a first normally closed controllable valve 3 to which, in turn, are coupled a second normally closed controllable valve 4, a normally closed emergency plug cock 5, a pressure transmitter 6 and a multiple-chamber body of an automatic decompression rate regulator 7. The pressure transmitter 6, the first controllable valve 3 and the multiple-chamber body of the regulator 7 intercommunicate through a T-fitting 8. The valves 3 and 4 are of the electromagnetic type.

The multiple-chamber body of the regulator 7, the emergency cock 5 and the first and second electromagnetic valves 3 and 4 are interconnected via a four-way fitting 9.

The multiple-chamber body of the regulator 7 communicates with a collar 10 and through a filter 11 with a controllable outlet throttle valve 12. Control of the valves 3 and 4 as well as obtaining information from the pressure transmitter 6 and from a microphone 13 are effected from a control panel 14 (FIG. 1) located on board ship 15 through a wiring 16. The control panel 14 is capable of simultaneous recording the pressure variation curve within the collar 10 as well as the appearance and disappearance of oscillations in a constricted artery.

Figure 2:
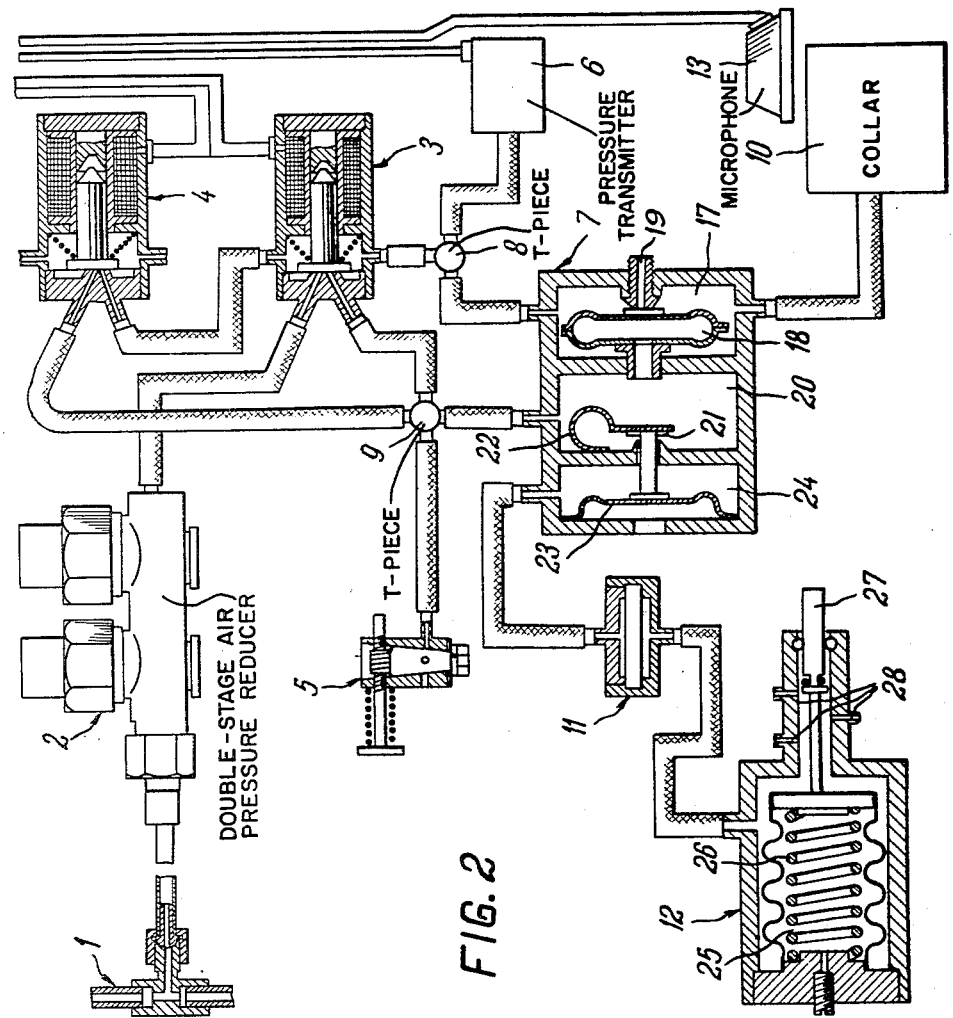
FIG. 2 is a diagrammatic view partly in elevation and partly in section of the device of the present invention.

The automatic decompression rate regulator 7 has a multiple chamber body and a chamber 17 (FIG. 2) thereof accommodates a membrane box 18 and a normally closed valve 19 while a chamber 20 includes a normally open valve 21 and a spring 22 which is solidly coupled to a membrane 23 in a chamber 24.

The controllable outlet throttle valve 12 includes a pressure-sensitive bellows 25 within which a spring 26 is located. The bellows 25 is coupled through a bearing rod to a piston 27 which, while travelling, closes outlet orifices 28 of different clear areas.

The operation of the device for measuring the arterial blood pressure in a diver under variable ambient pressure is as follows:

In response to an actuating signal arriving from the control panel 14, the valve 3 opens for a definite lapse of time whereby the excess pressure from the air pressure reducer 2 is admitted through the chamber 17 of the regulater 7 to the collar 10 as well as to the inlets of the valve 4 and the emergency cock 5, both being closed, then to the pressure transmitter 6, the chamber 20, via the valve 21 to the chamber 24 and further through the filter 11 to the outlet orifices 28 of the throttle valve 12.

With the excess pressure effective within the chamber 24, the valve 21 under the effect of the membrane 23 and the spring 22 is caused to close. Inasmuch as the chamber 24 communicates with the outlet orifices 28 of the throttle valve 12, the excess pressure within the chamber 24 drops to correspond to the ambient pressure. Thereupon the valve 21 opens again, the excess pressure is restored within the chamber 24 and the entire measuring cycle is repeated.

The valve 3 having been closed, the pressure reduction within the chambers 24, 20 and 17 occurs successively, and this is due to the pressure reduction within the chamber 20 causing the membrane box 18 to be deformed whereby the valve 19 opens and the excess pressure from the collar 10 is free to enter the atmosphere. Once the pressure within the chambers 20 and 17 has been equalized, the valve 19 is closed whereupon the entire cycle is repeated.

The consecutive operation of the valves 21 and 19 enables the excess pressure within the collar 10 picked up by the pressure transmitter 6 to be reduced in a linear dependence required for recording purposes.

The appearing and disappearing oscillations occurring in the constricted brachial artery of the diver are picked up by the microphone 13 and then converted into electrical pulses. The electrical pulses thus produced are delivered from the pressure transmitter 6 and the microphone 13 via the wiring 16 to the control panel 14 located on the ship 15.

For the purpose of safety as well as for releasing the excess pressure from the collar 10, provision is made for actuating the second controllable valve 4 and the emergency plug cock 5, both being normally closed. The valve 4 is actuated to open position by a control signal sent from the control panel 14 while the cock 5 is opened manually by the diver himself.

When measuring the arterial blood pressure in a diver working under conditions of variable ambient pressure which depends upon the depth of descent of the diver, the deformation of the bellows 25 occurs, and by virtue of the spring 26 being connected to the rod of the piston 27, the piston, while travelling, is capable of closing in a definite manner the outlet orifices 28 whereby the lapse of time required for the excess pressure within the collar 10 to drop is kept constant irrespective of any variation in the ambient pressure.

What is claimed is:

1. An apparatus for measuring arterial blood pressure in a living body under variable ambient pressure, comprising a source of a gaseous mixture under pressure, an inflatable collar operably connected to the source inflated with the gaseous mixture for solid adhesion to the artery of a wearer, a microphone for converting the oscillations of the walls of the artery into electrical signals, a transmitter operably connected with the collar for detecting pressure variations in the collar, a recording device receiving signals from the transmitter and microphone, an air pressure reducer associated with said source for stabilizing the pressure of the mixture delivered to the collar and the wearer, a first normally closed controllable valve for the source ensuring in its open position the admittance of the mixture through the reducer into the collar to provide in the collar the initial pressure exceeding the normal systolic pressure of the blood, an automatic regular operably related to the source and, for providing a linear drop of the pressure in the collar, said regulator being connected between said first controllable valve and said collar, said regulator having three chambers therein, the first chamber communicating with the collar and through said first controllable valve with the source of gaseous mixture, the second chamber receiving pressure through the first controllable valve and air pressure reducer, said third chamber having a sensitive membrane reacting to the difference in pressure in the third chamber and the ambient atmosphere, a membrane box controllable by said first controllable valve and dividing the regulator into the first and second chambers, normally closed vent operated by said membrane box, a normally open valve located between the second and third chambers and controlled by said sensitive membrane, a second normally closed controllable emergency valve located between the first controllable normally closed valve and said second chamber, a controllable outlet throttle valve operably connected to the third chamber of said regulator for providing the constant decompression pressure independently of the external pressure valve, and a manually operable emergency cock connected to said automatic regulator, and the first and second normally closed valves.

2. The apparatus for measuring arterial blood pressure as claimed in claim 1 in which said throttle valve includes a pressure sensitive bellows responsive to the variation of the external pressure, with the pressure within the bellows being equal to atmospheric pressure, a rod carrying a piston controlling the opening of the throttle valve and means connecting the bellows to the rod.

References Cited

UNITED STATES PATENTS

| | | | |
|---|---|---|---|
| 3,152,477 | 10/1964 | Peters | 73—393 X |
| 3,236,230 | 2/1966 | Follett | 128—2.05 |

WILLIAM E. KAMM, Primary Examiner

U.S. Cl. X.R.

73—393